(12) United States Patent  (10) Patent No.: US 6,301,508 B1
Matsuura  (45) Date of Patent: Oct. 9, 2001

(54) AUTOMATIC INSTRUMENTATION SYSTEM

(75) Inventor: Satoshi Matsuura, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/007,685

(22) Filed: Jan. 15, 1998

(30) Foreign Application Priority Data

Jan. 22, 1997 (JP) .................................................. 9-009726
Jul. 28, 1997 (JP) .................................................. 9-202006

(51) Int. Cl.⁷ .................................................. G05B 19/18
(52) U.S. Cl. .................................. 700/3; 700/20; 700/86; 700/5; 709/211
(58) Field of Search ................................. 700/26, 20, 9, 700/3, 4, 5, 86; 395/200.31, 290, 800.31, 200.38; 340/825.06; 709/211, 216, 220

(56) References Cited

U.S. PATENT DOCUMENTS

| 2,933,248 | * | 4/1960 | Steele | 370/216 |
| 4,833,605 | * | 5/1989 | Terada et al. | 710/130 |
| 4,980,806 | * | 12/1990 | Taylor et al. | 362/85 |
| 5,053,964 | * | 10/1991 | Mister et al. | 701/19 |
| 5,249,140 | * | 9/1993 | Kessler | 700/3 |
| 5,349,673 | * | 9/1994 | Yasuda | 709/211 |
| 5,815,668 | * | 9/1998 | Hashimoto | 709/238 |
| 5,870,301 | * | 2/1999 | Yakushiji et al. | 709/208 |
| 5,953,741 | * | 9/1999 | Evoy et al. | 711/132 |
| 5,978,352 | * | 11/1999 | Imaizumi et al. | 377/2 |
| 6,032,086 | * | 2/2000 | Hashimoto et al. | 700/245 |

FOREIGN PATENT DOCUMENTS

| 59-177697 | * | 10/1984 | (JP) . |
| 64-65957 |   | 3/1989 | (JP) . |
| 5-46893 |   | 2/1993 | (JP) . |
| 7-306065 | * | 11/1995 | (JP) . |

* cited by examiner

Primary Examiner—Paul P. Gordon
(74) Attorney, Agent, or Firm—Fish & Richardson P.C.

(57) ABSTRACT

An automatic instrumentation system is presented that enables to eliminate or significantly reduce the effort required in preparing instrument control programs. The system includes at least one instrument, a controller for controlling the instrument and a communication line linking the instrument with the controller. The activities of each instrument are controlled by a control programs, describing the detailed steps to be taken, dedicated to each instrument, and in the present system, a dedicated control programs for an instrument is pre-installed within the instrument. Instrument control is performed by the controller which acquires the control program from the instrument memory and executing the control program, through the communication line. If the present concept is applied to a network-based system of automatic instrumentation, it is possible to construct a system that is least affected by such problems as delays caused by line congestion and line cutoff. In such a system, a user machine and a controller are connected through a network and the controller and the instruments are connected with a high-speed communication line. A first control program for the instrument and a second control program for controlling the first control program are pre-installed in each instrument. The controller acquires both first and second control programs but forwards the second control program to the user machine. Thus, the user machine through the controller can direct the overall operation of the instrumentation system while, concurrently, the detailed activities of each instrument are being controlled by the controller and the user machine.

13 Claims, 3 Drawing Sheets

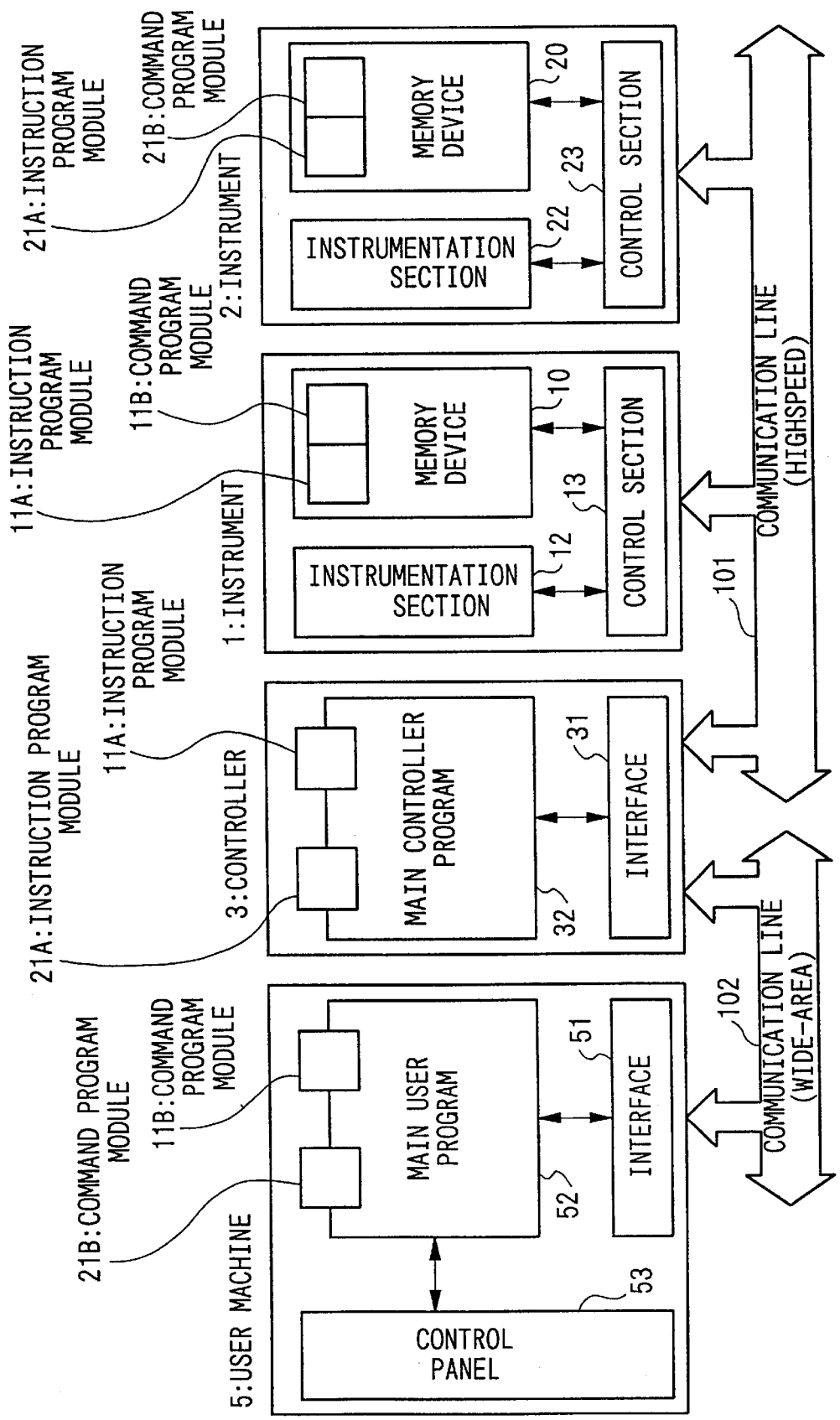

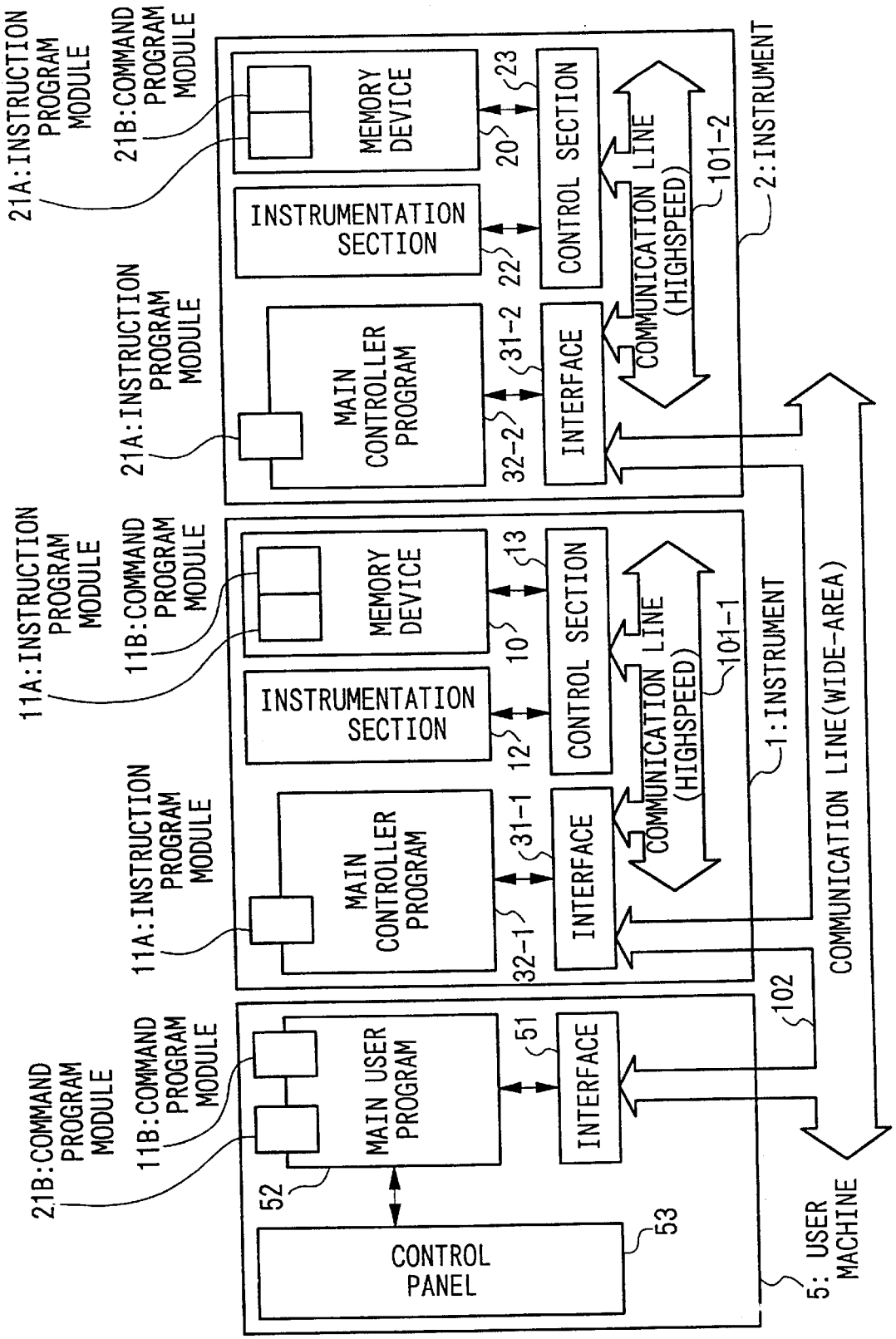

AUTOMATIC INSTRUMENTATION SYSTEM

BACKGROUND OF THE INVENTION

1. Field of the Invention

The present invention relates to an automatic instrumentation system for automatic control of a plurality of instruments which are connected to a controller through some communication lines. In particular, the invention relates to an automatic instrumentation system for remote control of a plurality of instruments which are in locations far removed from the user. The present invention is based on a Japanese Patent Application, H9-9726 and a Japanese Patent Application, H9-202006, the contents of which are incorporated herein by reference.

2. Description of the Related Art

Conventional automatic instrument control is performed as follows. First, a plurality of instruments are connected to a controller using communication lines which are in compliance with a general purpose interface bus (GPIB) or RS-232C. Next, various control programs for on-line control of selected instruments are prepared. These control programs are written in programming languages such as Beginner's All-purpose Symbolic Instruction Code (BASIC) or by combining control commands particular to each instrument. Next, the controller executes the control programs to operate the selected instruments to perform automatic control of the on-line instruments.

However, to construct such automated instrument control systems requires that the designers (i.e. system engineers) be familiar with programming skills for these control programs. It means that not every one can readily construct an automatic instrumentation system.

Also, in the various control programs, those sections of the program that are delivered to the instrument to carry out the detailed steps of an instrument are made up of a combination of control commands. Each instrument has its unique ways of commanding which are different than the commands used for other instruments, and it is virtually impossible to standardize all command protocols among the different instruments. This is because the control commands for different instruments are different, depending on their end uses and capabilities. Therefore, a programmer must first become thoroughly familiar with explanatory booklets for various instruments to have a complete grasp of the control protocol for these instruments, and then to start developing a control program for the system. Therefore, even for a person of competent programming knowledge, preparation of control programs is not a simple task.

Furthermore, because each instrument responds to different control commands, even when a control program is developed for one particular instrument, it is difficult to adopt the same control program in an automated instrument control system based on another instruments. For this reason, when the configuration of the automated instrument control system is to be altered leading to a need for another control program, the existing control program requires reprogramming, and this requires almost as much effort as developing a brand new control program for the system.

To overcome such difficulties, a development of a set of softwares may be considered. The approach is to prepare a library of control programs in the form of dedicated modules which contain detailed steps for each instrument. By combining suitable sets of control program modules, an overall control program for the automated instrument control system can be developed.

In more detail, the programmer who is preparing a system control protocol preinstalls the library containing the control program modules and control softwares into the controller. In the stage of preparing an actual program for the overall system control, the programmer selects the control program modules for the selected instruments from the library and builds them into a main control program for the overall system.

By taking such an approach, the necessity for understanding the details of the control commands for each instrument can be eliminated so that all that is needed by a system programmer is a rudimentary knowledge of programming, and the effort required in developing a system control program can be significantly reduced.

However, the above approach requires that the program library must house many program modules pre-installed in the controller to provide for possible future connection to the controller. In other words, it becomes necessary to pre-install all the modules even for those instruments which are not now connected but had been connected at one time to the controller, or those which have a potential to be connected to the controller at some future date. This leads to the necessity of having a very large storage capacity for the controller, and the attendant high prices for the controller.

It is possible, of course, to reduce the memory needs by installing only those program modules which are necessary for the currently selected instruments, however, this approach is quite inconvenient because it is necessary to later install a control program module for each new additional instrument to be connected to the controller. Another possible scenario is that the original storage medium such as a Compact Disk Read Only Memory (CD-ROM) storing the control program modules has been lost, resulting that an old instrument cannot be connected and operated. In other cases, some instruments may have only recently been introduced to the marketplace or that they are special instruments which are applicable to limited lines of work For such instruments, there is no assurance that control program modules are available for every instrument. When such instruments are to be incorporated into a system, it is necessary that the system engineer himself must prepare control programs as though there are no control softwares available.

SUMMARY OF THE INVENTION

It is an object of the present invention to provide an automatic instrumentation system that eliminates or significantly reduce the effort required in preparing a control program for each instrument connected to the system.

The object has been achieved by designing a system such that each instrument internally stores a control program dedicated to controlling own detailed steps. When a need arises, a controller selects an instrument, and acquires a control program for that instrument and executes the control program.

Accordingly, the effort required in preparing individual control programs has been eliminated or significantly reduced, so that anyone can construct and use an automatic instrumentation system. Also, there is no need in the present system to store control programs which are not currently needed in the controller, so that the memory capacity needed for storing the control programs in the controller is minimized and a less expensive system can be produced. Furthermore, because the control programs are stored in each instrument, such inconvenience as loss of the memory medium storing the original control programs, CD-ROM for example, has been eliminated.

Also, in the present system, each instrument internally stores its own control programs. The control programs are dedicated programs and control the detailed activities of the instrument. The controller, after acquiring the control programs from the instrument through the communication means executes the control programs to operate the instrumentation system. Therefore, the controller and the instruments can be connected through a network link, such as Internet, and in addition to the benefits described above, the system enables remote control of instruments.

Another object of the present invention is to provide an automatic instrumentation system which minimizes the adverse effects of network-based instrumentation system, such as time delays caused by line congestion and line cutoff.

The object has been achieved in an automatic instrumentation system having, prestored in each instrument, a first control program dedicated to control detailed steps of each specific instrument, and a second control program for directing the operation of the first control program. The system controller executes the first control program acquired from the instrument through the second communication means while the user machine executes the second control program acquired from the instruments by the system controller through the first communication means. Thus, the user machine through the system controller is able to direct the overall operation of the instrumentation system while, concurrently, the detailed activities of each instrument are being controlled by the system controller and the user machine.

This system present additional advantages as follows: when operating a network-linked instruments, the first communication means provides the far-reaching network connection to the user machine while the second communication means provides high-speed links between the controller and various instruments. This approach minimizes operational problems such as time delays caused by line congestion and line cutoff. Further, the user machine does not need to store control programs for instruments which are not now in use, so that the memory capacity in the user machine can be kept to a minimum, thereby lowering the cost of overall system and increasing the cost efficiency of system operation.

BRIEF DESCRIPTION OF THE DRAWINGS

FIG. 2 is a block diagram of a second embodiment of the automatic instrumentation system.

FIG. 3 is a of block diagram of a modification of the automatic instrumentation system shown in FIG. 2.

DESCRIPTION OF THE PREFERRED EMBODIMENTS

First Embodiment

Figure 1:
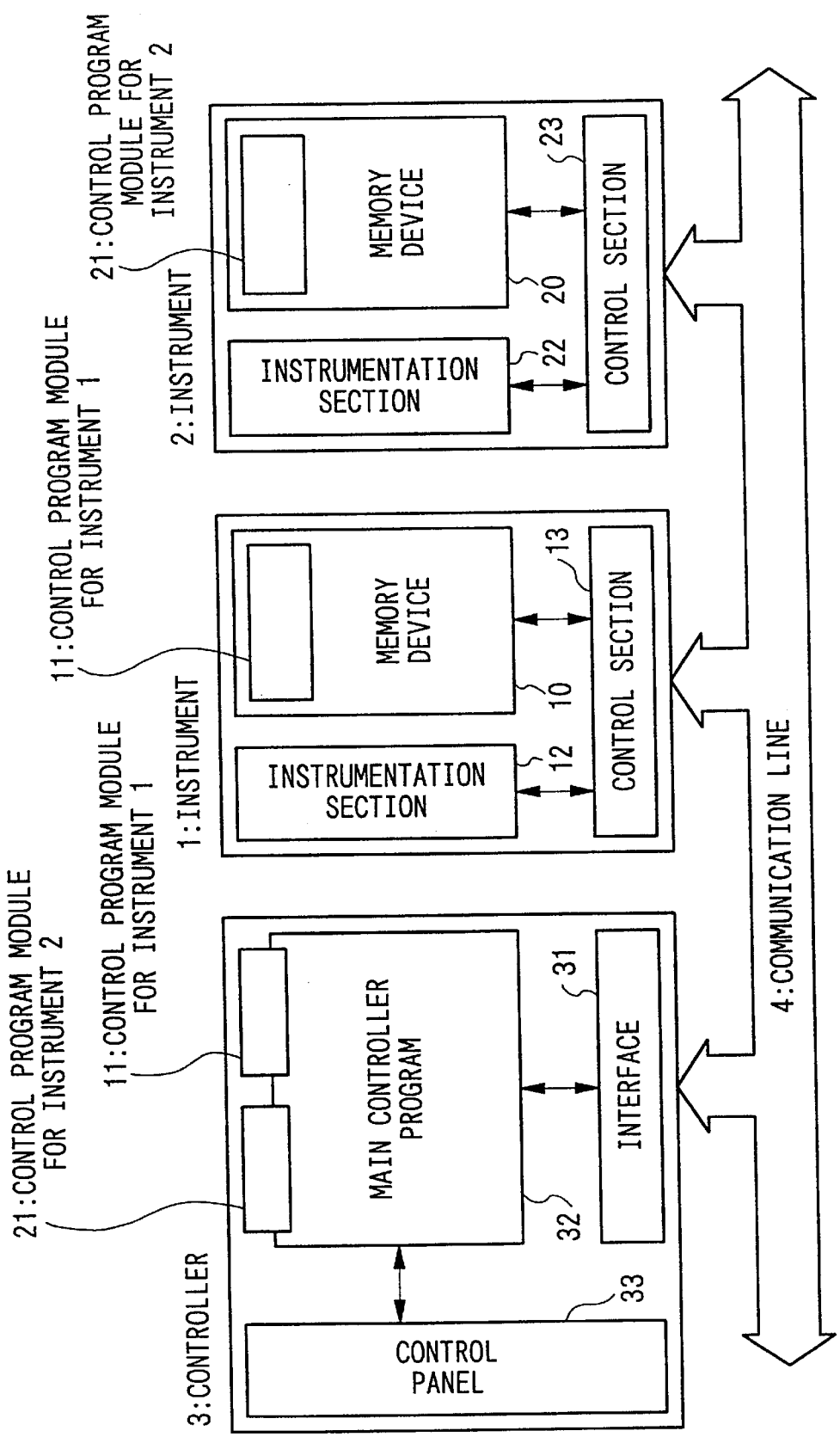
FIG. 1 is a block diagram of a first embodiment of the automatic instrumentation system.

In the following, a first embodiment will be presented with reference to FIG. 1. In this automatic instrumentation system, two instruments, instrument 1 and instrument 2, and system controller 3 are connected with communication lines (shortened to com lines hereinbelow) 4. It is obvious that the number of instruments to be connected to the system need not be limited to two, such that one instrument or more than three instrument may be connected to the control system.

Instrument 1 has a memory device 10 which stores a control program module 11. The memory device 10 uses memory devices such as a ROM but a random access memory (RAM) may also be used. Instrumentation section 12 controls actual operation of the instrument 1 under the command of the control section 13. The control program module 11 is a program library constituted by a collection of a number of control program modules. Each of these control program modules controls various detailed steps of instrument activities executed by the instrumentation section 12, and is constituted by combining various commands for the instrumentation section 12. Control section 13 controls various sections of instrument 1 according to commands issued by the system controller 3.

Instrument 2 includes a memory device 20, a control program module 21, instrumentation section 22 and a control section 23. The configuration of these sections are the same as those corresponding sections in instrument 1.

An interface 31 in the system controller 3 manages communication between the system controller 3 and com lines 4. The main controller program 32 stores control programs for the operation of the entire instrumentation system. The main controller program 32 is able to incorporate the control program module 11 stored in instrument 1 and the control program module 21 stored in instrument 2.

In further detail, the main controller program 32 only provides rough controls including start/stop commands for instruments 1, 2. In other words, descriptive programs for controlling the detailed steps of instruments 1, 2 are not stored in the control programs in the main controller program 32, but are provided in the control program modules 11 and 21.

Control panel 33 is a device for the operator of the automatic instrumentation system to issue various instructions to the system controller 3. The com lines 4 use such com lines as GPIB and RS-232C which comply with the interface standards.

The operation of the automatic instrumentation system will be explained.

First, through the control panel 33, the operator commands the system controller 3 to start the instrumentation system. System controller 3 sends a read-command to instrument 1 to acquire the control program module 11, through interface 31 and com lines 4, according to the descriptions in the main controller program 32. Similarly, system controller 3 sends a read-command for the control program module 21 to instrument 2.

Control section 13, upon receiving and decoding the read-command for the control program module 11, forwards the control program module 11, which has been read out of the storage device 10, through com lines 4 to the system controller 3. System controller 3 receives the control program module 11 through the interface 31, and builds the received control program module 11 into the main controller program 32.

Similarly, control section 23, upon receiving and decoding the read-command for the control program module 21, which has been read out of the storage device 20, forwards the control program module 21 through com lines 4 to the system controller 3. System controller 3 builds the control program module 21 received through the interface 31 into the main controller program 32.

Having incorporated the control program modules 11, 21, the system controller 3 begins a process of control over the overall operation of the automatic instrumentation system to carry out actual detailed steps according to the descriptions in the main controller program 32. When the system controller 3 detects an instruction to operate instrument 1 in the main controller program 32, the system controller 3 transfers an instrument control function to the control program module 11 embedded in the main controller program 32. Next, system controller 3 controls the instrumentation section 12, according to the description in the control program module 11, through the interface 31, com lines 4 and the control section 13, so as to execute the required steps of instrument 1.

Similarly, when the main controller program 32 detects an instruction to operate instrument 2, the system controller 3 transfers a control function to the control program module 21 embedded in the main controller program 32, then, the system controller 3 controls the instrumentation section 22, according to the description in the control program module 21, so as to execute the steps of instrument 2.

Accordingly, in the present embodiment of the automatic control system, a read-command is newly added to the system controller 3, as a standardized control command to communicate the system controller 3 with each instrument. It can be seen that an addition of one command enables the controller to optimally control both instrument 1 and instrument 2, because they have dedicated internal commands for their detailed steps.

Also, in the present control system, the size of program 32 can be made small because the main controller program 32 includes only a read-command for the control program module 11, a read-command for the control program module 21 and a system control program for controlling the operation of the overall automatic instrumentation system. Accordingly, a small capacity memory device is sufficient to store the controller program 32.

Also, according to the present embodiment, there is no need for pre-installing control program modules for all the instruments which might possibly be connected to the system controller 3. Instead, it is only necessary to acquire relevant control program modules from each of the instruments which are actually being connected to the system controller 3 (in FIG. 1, instruments 1 and 2), and incorporated them in the main controller program 32. It follows that the memory capacity for the system controller 3 to store control program modules can be minimized.

Second Embodiment

As described above, the first embodiment system utilized com lines 4 GPIB and RS-232C which comply with the interface standards. The maximum cable length in the GPIB is limited to 20 meters, and in RS-232C, it is 15 meters. Therefore, the automatic instrumentation system presented in the first embodiment cannot be applied when instruments are to be controlled from a location far removed from the instruments.

In such a case, optical fibers may be considered to extend the effective cable length of GPIB and RS-232C lines, thereby allowing the application of the first embodiment system to control remote instruments.

It is necessary, of course, to install optical fibers so that this does not represent a simple solution to the requirement of remote control of instruments. Also, the configuration presented in the first embodiment is not compatible with network-based systems, such as local area network (LAN) or Internet. The reason is that such network is also connected to systems other than the automatic instrument control system being considered. More specifically, as the network becomes congested, an increase in the delay time due to delays in network connections and the corresponding delays in the response time will arise, and in extreme cases, the connection itself may become severed during the use.

Therefore, the second embodiment of the instrument control system includes an improvement over the first embodiment so that the system is able to perform remote control of instruments, by preventing an increase in time delays caused by network congestion and minimizing adverse effects of disconnection from the network, by providing a first module for giving detailed instructions to a particular instrument and another module for directing the operation of the first module and providing appropriate com lines for each function.

FIG. 2 is a block diagram of an automatic instrumentation system of the second embodiment. In FIG. 2, those components which are the same as those in FIG. 1 are given the same reference numerals and their explanations are omitted. In this system, instruments 1, 2 and the system controller 3 are connected with com lines 101 and a user machine 5 and the system controller 3 are connected with com lines 102. It should be noted here that, as in the first embodiment, there are no restrictions on the number of instruments to be connected to the control system.

In instrument 1, a memory device 10 stores an instruction program module 11A and a command program module 11B. The instruction program module 11A has the same instruction capabilities as the control program module 11 presented in the first embodiment. On the other hand, the command program module 11B is constituted by programs to control operation of the instruction program module 11A which carries out detailed steps. In other words, command program module 11B is a program to direct the detailed activities of instrument 1 through the instruction program module 11A, i.e., the detailed steps of instrument 1 are controlled in stages by both modules 11A and 11B.

Similarly for instrument 2, a memory device 20, corresponding to memory device 10, stores an instruction program module 21A and a command program module 21B. The functions of the modules 21A, 21B are the same as those for the modules 11A, 11B.

The interface 31 in the system controller 3 controls communications between the system controller 3 and com lines 101 or between the system controller 3 and com lines 102. The main controller program 32 incorporates the instruction program modules 11A and 21A obtained from instrument 1 and instrument 2, respectively. The main controller program 32 controls the detailed steps of each instrument by executing these program modules, and provides a rough control over instruments 1, 2, user machine 5 and com lines 101, 102, including start/stop steps of each instrument.

In the meantime, the user machine 5 in the second embodiment system is a device to control the overall operation of the automatic instrumentation system, and directs the activities of instruments 1, 2 through the system controller 3. The interface 51 manages communications between the user machine 5 and com lines 102. The main user program 52 incorporates the command program module 11B and 21B respectively acquired from instruments 1 and instrument 2 through the system controller 3. The main user program 52 controls the detailed activities of each instrument by executing respective program modules, and provides a rough control over instruments 1, 2, system controller 3 and com lines 101, 102, including start/stop steps of each instrument. It can be seen that control of the detailed steps of each instrument is carried out not by the main control programs 32 or the main user program 52 but by the respective program modules built into the main control programs from the selected instruments.

In the user machine 5, control panel 53 is a device for the operator to provide various instructions to the automatic instrumentation system.

The com lines 101 are used primarily to communicate instructions necessary to perform detailed steps of instruments 1 and 2. On the other hand, com lines 102 are used to transmit start/stop commands as well as to report execution status of the instruments.

Therefore, a large volume of data are transmitted over the com lines 101; and the processing speed of com lines 101 affects the overall system processing speed. For this reason, it is desirable to use communication lines which are not vulnerable to delays and are not exposed to danger of line cutoff. In comparison, the volume of data over the com lines 102 is relatively small, and the processing speed of com lines 102 does not greatly affect the system processing speed. Therefore, com lines 102 can be used for network-based systems, so, LAN and Internet which are susceptible to delays and line severance are good candidates. For example, if Internet can be used for com lines 102, the distance between the system controller 3 and the user machine 5 can be made virtually unlimited.

Next, the operation of the above automatic instrumentation system will be explained.

First, the operator commands through the control panel 53 to start the operation of the instrumentation system, then the user machine 5 begins actions that are necessary to operate the instruments according to the descriptions in the main user program 52. Specifically, the main user program 52 commands the main controller program 32 to acquire control program modules from each of the instruments to be used.

Accordingly, the main controller program 32 in the system controller 3 sends a read-command, through the interface 31 and com lines 101, to instrument 1 so as to acquire the instruction program module 11A and the command program module 11B, and a read-command to instrument 2 so as to acquire the instruction program module 21A and the command program module 21B.

In response, the control section 13 decodes the read-command received from the system controller 3, and acquires the instruction program module 11A and the command program module 11B from the memory device 10, and forwards the modules 11A, 11B to the system controller 3 through com lines 101. The system controller 3, having received modules 11A, 11B from instrument 1, incorporates the instruction program module 11A into the main controller program 32 while forwarding the command program module 11B to the user machine 5 through com lines 102.

Similarly, the control section 23 in instrument 2 decodes the read-command received from the system controller 3, and acquires the instruction program module 21A and the command program module 21B from the memory device 20, and forwards the modules 21A, 21B to the system controller 3 through com lines 101. The system controller 3 receives modules 21A, 21B from instrument 2 and builds the instruction program module 21A into the main controller program 32 while forwarding the command program module 21B to the user machine 5 through com lines 102. The user machine 5, having received command program modules 11B, 21B, from the system controller 3, builds these modules into the main user program 52.

After completing the incorporation processes, the user machine 5 begins the actual actions necessary to operate the instruments. Specifically, the main user program 52 in the user machine 5 controls the detailed steps of the instruction program modules 11A and 21A according to the command program modules 11B and 21B. The result is that the system controller 3 controls the operation of instrument 1 through the main controller program 32 so that the control section 13 operates the instrumentation section 12 according to control module 11A under the command of command program module 11B. Similarly, the system controller 3 controls the operation of instrument 2 through the main controller program 32 so that the control section 23 operates the instrumentation section 22 according to instruction program module 21A under the control of command program module 21B.

Suppose the operator requests a status report through the control panel 53, then, the main user program 52 so instructs the main controller program 32. Accordingly, the main controller program 32 obtains a status report from instruments 1 and 2. Next, the main controller program 32 forwards the status reports to the main user program 52 through com lines 102. The main user program 52 carries out necessary steps, such as display of received information and printing and other activities, through the control panel 53. Similarly, if the operator commands to terminate the operation through the control panel 53, the main user program 52 so instructs the main controller program 32. Then, the main controller program 32 commands the control sections 13 and 23 to stop operation of the instrumentation sections 12 and 22.

As explained above, in the present embodiment system, one read-command has been added so that various instruments are operated by the user machine 5 through interfacing with the system controller 3 which acquires the necessary modules from each of the relevant instruments. Accordingly, the same read-command is used to build the instruction program modules 11A and 21A from instruments 1 and 2 into the system controller 3, and also to build the command program modules 11B and 21B into the user machine 5. It can be seen that an addition of one read-command is sufficient to optimally control instruments 1 and 2.

Also, in this embodiment, the main user program 52 is only required to have an ability to acquire the command program modules 11B, 21B, and an ability to embed the command program modules into its own program 52 and execute their instructions. Therefore, the size of the main user program 52 can be made small, thus enabling to reduce the memory storage capacity necessary for the main user program 52. Similarly, the main controller program 32 is only required to have an ability to acquire modules 11A, 11B, 21A, 21B, an ability to transfer the command program modules 11B and 21B to the user machine 5, and an ability to build the modules 11A and 21A and execute their instructions. Therefore, the size of the main controller program 32 can be made small, and the memory storage capacity for the main controller program 32 can be reduced.

Furthermore, as in the first embodiment, only those modules, which are needed at the start time of instrument use, are acquired from the relevant instruments to enable building such modules into the main control programs 32 and 52, thus reducing the memory capacities needed for the system controller 3 and the user machine 5.

Modification Example 1

In each of the foregoing embodiments, com lines 4 (FIG. 1) and com lines 102 (FIG. 2) may be replaced with com lines used in Transmission Control Protocol/Internet Protocol (TCP/IP) systems. Some typical examples of such com lines are 10BASE-2/10BASE-5/10BASE-T standards. Of course, the present invention is equally effective when the conventional GPIB and RS-232C connections are used in a TCP/IP system.

When using these types of communication lines, because of the large number of online users, there are danger of increasing the delay time and line cutoff. However, the second embodiment system is arranged so that important communication for automatic instrumentation is performed through com lines 101, which are secured local connections, so that such problems do not affect the performance of instruments.

Modification Example 2

In each of the foregoing embodiments, the instruments 1 and 2 may be provided with server functions such as Hyper Text Transfer Protocol (HTTP) or File Transfer Protocol (FTP). In such a system, the system controller 3 acquires a control program module from an instrument through the server provided in the instrument. In this case, because the transfer command to the instrument for the control program module is performed entirely within the HTTP or FTP process, instrument control commands can be clearly distinguished from the module transfer commands, thereby avoiding any confusion which might arise between instrument commands and read-commands for the program modules.

Modification Example 3

The system controller 3 in the system presented in the second embodiment may be provided with a HTTP, FIP or proxy server function. These server functions are used when transferring the command program module 11B from instrument 1 and the command program module 21B for instrument 2 through the system controller 3 to the user machine 5.

Modification Example 4

In each of the foregoing embodiments, descriptions in the control program modules are provided in a certain programming language, for example, BASIC language mentioned above. So, the system controller 3 or the user machine 5 can be provided with an environment to enable direct execution of source programs written in the language or an environment to enable execution of intermediate codes obtained by converting the source programs to an intermediate language.

In other words, a source program compiler or an intermediate code interpreter can be pre-installed in the system controller 3 or the user machine 5. Then, the Central Processor Unit (CPU), which controls the system controller 3 or the user machine 5 can directly execute a machine language by compiling the source program or interpret the intermediate code.

By doing so, the control program modules no longer depend on the type of CPU used so that the need to prepare control program modules for each type of system controller 3 or user machine 5 is eliminated, and the control program modules can be unified under a common operational language. In addition, by making the control program modules in one programming language, effort for preparing the control programs is simplified.

Also, these control program modules can be described in a programming language of JAVA (trademark), and provide the system controller 3 and the user machine 5 with a JAVA environment. By so doing, the system becomes network-friendly, including Internet.

Modification Example 5

In each of the foregoing embodiments, instruments 1 and 2 may be provided with functions to rewrite the contents of the memory devices 10, 20 externally, by using such memory devices including read/write integrated circuit (IC) memory devices such as RAM, or other read/write memory devices such as hard disk and opto-magnetic disk. In preparation, the system controller 3 (i.e., main controller program 32) and the user machine 5 (i.e., main user program 52) should be configured so as to accept a module-write command. The operator can then rewrite the modules through the control panels 33, 53 so that the modules can be periodically updated to avoid their obsolescence.

When the memory devices 10, 20 are made rewritable, such memories should be security protected. Such a security function can be provided to either the control section 13 or 23 or to the system controller 3 (in the main controller program 32) or to the user machine 5(in the main user program 52) so that they can not be written over. By doing so, accidental or intentional rewrite can be prevented, and the modules can be made more secure. This is useful when interfacing with a wide-area network, such as Internet, so that damage due to computer viruses can be prevented beforehand.

Modification Example 6

In the second embodiment system, the functions of system controller 3 and com lines 101 can be incorporated into the instruments 1 and 2. A block diagram of such a system is shown in FIG. 3. The modified system has an interfaces 31-1, 31-2 internally in both instruments 1 and 2, in place of one interface 31 shown in FIG. 2. Also, in place of one main controller program 32 in FIG. 2, main controller programs 32-1, 32-2 are provided internally for instruments 1 and 2, respectively. Additionally, in place of one com line 101, interface 31-1 is connected to controller 13 with com line 101-1 and interface 31-2 is connected to controller 23 with com line 101-2. Additionally, the user machine 5 and instruments 1, 2 are connected with com line 102 through interfaces 31-1, 31-2 and 51.

In this configuration, the main controller program 32-1 accepts only the instruction program module 11A and the main controller program 32-2 accepts only the instruction program module 21A The module embedding process is carried out internally in the instruments 1 and 2.

The modified system has a simple overall configuration, and the cost of the system would be reduced.

Modification Example 7

In each of the foregoing embodiments, control program modules acquired from instruments 1, 2 are embedded into main control programs 32 and 52. However, such modules may be made an independent program entity separate from the main control programs.

Modified Example 8

In the second embodiment system, an existing technology for distributed inter-object communication mechanism may be applied to the system controller 3 and user machine 5. In such a system, the system controller 3 and the user machine 5 may be physically separate but they can be treated as if the system controller 3 and user machine 5 are located within one control device. There is no need to change anything in instruments 1, 2, control program modules 11A, 11B, 21A and 21B.

It is obvious that any of the above modified examples can be combined with other examples and embodiments to construct a suitable automatic instrumentation system to suit any special application, without deviating from the basic concept of the present invention that control program modules need not be stored in a controller/user machine but that they can reside most effectively within each instrument so that they can be acquired by the controller as they are needed by the system.

What is claimed is:

1. An automatic instrumentation system for controlling activities of at least one instrument device comprising:
    at least one instrument device;
    a system controller;
    a user machine;
    a first communication line for communicating program information between said system controller and said user machine; and a second communication line for communicating program information between said instrument device and said system controller;

wherein said instrument device for performing device activities includes a first memory unit that pre-stores a first control program, which is executed on said system controller and is dedicated to controlling detailed steps of said device activities, and a second memory unit that pre-stores a second control program to direct program activities of said first control program;

wherein said system controller having a first reading unit for acquiring said first control program from said first memory unit and a first operational control unit for directing overall operation of said device activities while executing said first control program to control detailed steps of said device activities; and wherein said user machine is provided with a second reading unit for acquiring said second control program from said second memory unit through said system controller, and a second operational control unit for directing overall operation of said device activities while executing said second control program to control detailed steps of said device activities.

2. A system according to claim 1, wherein said first communication line provides a network-based linkage.

3. A system according to claim 1, wherein said first communication line provides a TCP/IP compliant communication linkage.

4. A system according to claim 3, wherein said first reading unit and said second reading unit are provided with a server for executing specific server functions, and respectively acquire said first control program and said second control program using said specific server functions of said server.

5. A system according to claim 3, wherein said system controller is provided with a server for executing specific server functions, and embeds said second control program in said user machine using said specific server functions of said server.

6. A system according to claim 1, wherein said first control program and said second control program are a source program written in a specific programming language, and said first operational control unit and said second operational control unit are each provided with a compiling unit for compiling and executing said source program.

7. A system according to claim 6, wherein said source program is written in JAVA.

8. A system according to claim 1, wherein said first control program and said second control program are written in intermediate codes obtained by compiling a program written in a programming language into an intermediate language, and said first operational control unit and said second operational control unit are each respectively provided with an interpreter unit for interpreting and executing said intermediate codes.

9. A system according to claim 1, wherein said first memory unit and said second memory unit are rewritable memory media storing said first control program and said second control program, respectively, and are further provided with a rewriting unit for altering said first control program and said second control program.

10. A system according to claim 9, wherein said rewriting unit is provided with a write inhibit unit for preventing rewriting of said first control program and said second control program.

11. A system according to claim 1, wherein an amount of data transmitted over said first communication line is less than an amount of data transmitted over said second communication line, and said second communication line has a shorter delay time and lower danger of line cutoff compared with said first communication line.

12. An automatic instrumentation system comprising:

at least one instrument device;

a user machine; and a first communication line that enables said instrument device to communicate program information with said user machine, wherein the instrument device carries out device activity and further comprises:

a first memory unit for pre-storing a first control program dedicated to controlling detailed steps of said device activity;

a second memory unit for pre-storing a second control program, which is executed on said user machine, to direct program activities of said first control program;

a first reading unit for acquiring said first control program from said first memory unit;

a first operational control unit for directing overall operation of said device activities while executing said first control program to control detailed steps of said device activities; and a second communication unit for enabling communication between said first reading unit and said first operational control unit; and wherein the user machine further comprises:

a second reading unit for acquiring said second control program from said second memory unit through said second communication line and said first communication line; and a second operational control unit that directs the overall operation of said instrumentation device by executing said second control program for controlling the detailed steps of said instrument activity.

13. A system according to claim 12, wherein an amount of data transmitted over said first communication line is less than an amount of data transmitted over said second communication line, and said second communication line has a shorter delay time and lower danger of line cutoff compared with said first communication line.

* * * * *